United States Patent [19]
Lejeune et al.

[11] Patent Number: 6,101,527
[45] Date of Patent: Aug. 8, 2000

[54] SYSTEM FOR MANAGING AND PROCESSING DISTRIBUTED OBJECT TRANSACTIONS AND PROCESS IMPLEMENTED BY SAID SYSTEM

[75] Inventors: Herve Lejeune, San Francisco, Calif.; Frederic Bouchy, Villepreux; Philippe Coq, Gieres, both of France

[73] Assignee: Bull S.A., Louveciennes, France

[21] Appl. No.: 08/972,270

[22] Filed: Nov. 18, 1997

[30] Foreign Application Priority Data

Nov. 18, 1996 [FR] France ................................... 96 14027

[51] Int. Cl.[7] .................................................. G06F 15/16
[52] U.S. Cl. ......................... 709/201; 709/221; 707/202
[58] Field of Search .................................... 709/201, 303, 709/221; 707/10, 202, 201, 203, 204, 6, 8

[56] References Cited

U.S. PATENT DOCUMENTS

| | | | |
|---|---|---|---|
| 4,754,400 | 6/1988 | Wakahara et al. | 714/1 |
| 5,473,680 | 12/1995 | Porter | 379/201 |
| 5,680,610 | 10/1997 | Smith et al. | 707/10 |
| 5,764,897 | 6/1998 | Khalidi | 709/201 |
| 5,907,849 | 5/1999 | Dias et al. | 707/202 |
| 5,920,863 | 7/1999 | McKeehan et al. | 707/10 |

OTHER PUBLICATIONS

IBM Technical Disclosure Bulletin, vol. 38, No. 3, Mar. 1, 1995, pp. 617–619, XP000508157, "Use of XA–Compliant to Interoperate With Object Transaction Service".

Computer Journal, vol. 37, No. 6, Jan. 1, 1994, pp. 487–498, XP000481004, Taylor P. et al.: "Combining Object Oriented Systems and Open Transaction Processing".

*Primary Examiner*—Zarni Maung
*Assistant Examiner*—Khanh Quang Dinh
*Attorney, Agent, or Firm*—Miles & Stockbridge P.C.; Edward J. Kondracki

[57] ABSTRACT

The present invention relates to a system and process for managing and processing object transactions in a network of distributed resources operating in the client-server mode, wherein the client sends a request to at least one transaction object contained in at least one of the servers (RS1, RS2, etc.) distributed across the network, while a transaction manager dialogues with a resource manager (RM) through a predefined interface by means of a transaction validation protocol. This system is noteworthy in that it achieves the implicit integration of resource managers (RM) adapted to the predefined interface, so as to integrate the participation of existing or future resource managers (RM) into a distributed transaction managed by the transaction manager, by providing objects capable of participating in the transaction validation protocol implemented by the transaction manager, which objects address the resource managers through the predefined interface. For this purpose, in the present system, each server comprises a specific local component (LOC1, LOC2, etc.) which encapsulates the calls to the predefined interface in the form of objects called resource objects (RSO), while moreover one server for managing the predefined interface (XAMS) is provided per domain for implementing the encapsulation of the transaction validation protocol, thus allowing multiple distributed objects to execute multiple requests in the same single transaction.

20 Claims, 2 Drawing Sheets

SYSTEM FOR MANAGING AND PROCESSING DISTRIBUTED OBJECT TRANSACTIONS AND PROCESS IMPLEMENTED BY SAID SYSTEM

BACKGROUND OF THE INVENTION

1. Field of the Invention

The present invention relates to a system for managing and processing object transactions in a network of distributed resources operating in the client-server mode, wherein the client sends a request to at least one transaction object contained in at least one of the servers distributed across the network, while a transaction manager dialogues with a resource manager through a predefined interface and by means of a transaction validation protocol. It also relates to the process implemented by this system.

2. Description of Related Art

Traditionally, and for a long time, the control and management of transaction data have been carried out by means of centralized mainframe computers. These machines were initially accessible locally, then later through networks which became increasingly complex, but were still hierarchical. It is only more recently that the distributed model based on open systems has been used. Generally, a distributed management environment makes it possible to integrate the administration of systems, networks and user applications, the dialogue between the various machines of the system and/or between the various users being organized around requests and responses to these requests, the most common requests in a network being related to file access or data access. An application is said to be designed according to a "client-server" architecture when it is comprised of two independent programs which cooperate with one another to implement the same process, each of which runs in an environment of its own (machine, operating system), and a programming interface using a language composed of commands makes it possible to control their dialogue. The client-server mode has the advantage of enabling a user (for example a simple microcomputer) called a client to delegate part of its task or its operations to be executed to a server. In this way, the client has at its disposal a computing capacity much greater than that of its own microcomputer. Likewise, a client can address a specialized server and effectively outsource an operation, the server being under optimal conditions in terms of implementation and expertise due to its specialization. In this context, the object of the transaction processing service is to provide the specific functions required for running applications which modify a given situation in real time. Transaction processing applications use services which guarantee that the transactions are carried out completely or are not executed at all. It must be recalled here that a transaction is a set of commands which have no significance unless all of them are executed, a concept which guarantees the consistency and the integrity of the data. The completion of transactions, which is known as validation or consolidation ("commitment" to one skilled in the art), must consequently have certain characteristics. Thus, the transaction processing service must ensure that the transaction applications are "Atomic," "Consistent," "Isolated" and "Durable" (ACID), "atomic" meaning that all the elements of the transaction are processed or no element is processed, "coherent" meaning that if any part of the transaction is not executed, all the parts of the system affected by this transaction remain in their original state, "isolated" meaning that during the processing of a transaction, the shared resources of the system are not accessible to another transaction, "durable" meaning that the results of a completed transaction are permanent and are not lost, and thus that in case of a fault or failure, the transaction is not lost. All of these properties consequently make it possible to keep the data, which constitute a non-negligible part of the property of an organization, consistent and constantly updated no matter what type of failure occurs (program, system, hardware, or communications). Providing these properties has become more difficult as the transaction systems themselves have become more sophisticated. At the present time, transactions generally involve a plurality of systems and affect various data bases as well as various types of resources. In order to manage these systems, the transaction processing service manages the resources so as to guarantee the coordination of the validations and provides specialized communications for managing the distributed transaction processing applications. The transaction processing service must also coordinate the various applications which must be involved in processing a global transaction. For this reason, the transaction environment must offer a certain flexibility, the "X/OPEN" environment being a good example in that it makes it possible to effectively complement the transaction processing services working on large volumes of transactions and to manage an architecture using distributed transaction processing. In this way, the applications can use distributed data bases in a transparent manner.

In the field of object-oriented applications, a certain number of rules have been adopted for defining a common object, giving birth to the distributed object model. The OMG (Object Management Group) has been particularly active in managing this problem, proposing models, definitions and an architecture which effectively respond to the various concerns of the industry. In effect, a unique architecture using an object-oriented technology has been developed for allowing easy integration of distributed applications by guaranteeing the re-use of components already created, interoperability and portability, as well as the availability of software interfaces for simple and rapid use of the products on the market. According to the OMG definition, an object is the "combination of a state and a set of methods," which object can be any resource that responds to requests specific to services. In order to provide a common architecture that makes it possible to respond to these requests, the OMG has defined a reference model having four main components. The first is the ORB (Object Request Broker), a software bus which is in fact a set of devices which, in a distributed environment and in a completely transparent manner, enable a client to send requests to (and receive responses from) objects distributed across a network, without concern for the location of these objects. The second corresponds to a set of services called object services, which provide interfaces and objects having basic functions for creating and maintaining objects, functions such as persistence, naming, event notification, transactions, etc. The third component relates to the common services, which provide a set of interfaces and objects offering general functions that can be used by a large number of applications or systems independently from the domain of the application, facilities such as printing, intermediate storage, electronic mail or so-called intelligent agents. The fourth component provides application objects specific to determined user applications such as, for example, orders, bills, clients, etc.

More particularly, in this transaction context, the "X/OPEN" distributed transaction processing model defines resource managers as being components which authorize access to shared resources such as data bases, file systems or print servers. A resource wherein the data are assigned by the validation ("commit") or cancellation ("rollback") of a transaction is said to be recoverable. In the case of a validation ("commit"), the modifications and updates already executed are rendered effective, in the case of a cancellation ("rollback"), the resource remains in its original state before the transaction, and in case of error, the operations of the transaction in progress are cancelled. By controlling access to a recoverable shared resource, the resource manager makes it possible to guarantee that this resource will return to a consistent state after any potential failure. X/OPEN defines an interface, the XA interface, between the transaction manager and the resource manager. This predefined and standardized interface allows the involvement and the cooperation of heterogeneous resource managers in a single distributed transaction and adheres to a selected two-phase commit protocol managed by the transaction manager. The main interactions in the X/OPEN distributed transaction processing model are the following. First, a client application initiates a transaction, then by sending requests, it involves shared resources to which the transaction relates, which shared resources are managed by resource managers. Next, the client application starts and finishes the transaction. At the completion of the transaction, the transaction manager contacts the resource servers and coordinates the two-phase commit protocol through the XA interface. However, a technological choice of this type has considerable drawbacks, particularly due to the complexity of the utilization of this interface by a server in this transaction environment. In effect, in order to execute a transaction, a server intending to use a data base must use this interface from the start to indicate its participation in this transaction and its intention to use the data base, and each time requests arrive, it must specify that the latter are part of the transaction, after which it completes its participation in the transaction, a response to the requests having been provided, while moreover, it must be able to communicate with the transaction manager so as to be capable of reacting to its promptings during the implementation of the two-phase commit protocol. This dialogue with the predefined interface becomes even more complex the larger the number of data bases this server intends to access. Moreover, the requests passing through the ORB only add to the complexity of a utilization of this type. Finally, the compatibility between relational data base systems and the specifications of the XA interface is far from complete, rendering any true portability problematic.

SUMMARY OF THE INVENTION

The object of the present invention is to eliminate the drawbacks of the prior art and to offer a system for managing and processing transactions that is efficient and simple to use.

To this end, the system for managing and processing transactions mentioned in the preamble is noteworthy in that it achieves the implicit integration of resource managers adapted to the predefined interface, so as to integrate the participation of existing or future resource managers into a distributed transaction managed by the transaction manager by providing objects capable of participating in the transaction validation protocol used by the transaction manager, which objects address the resource managers through the predefined interface.

Thus, when a server uses a resource through a resource manager (for example a data base), the participation of this data base in the transaction is managed directly by the present system, which means that this data base is encapsulated, and all the calls to the predefined interface are executed implicitly and are hidden from the programmer of the application, who consequently does not have to worry about them.

Advantageously, in order for several servers to be able to use the same data base, each server comprises a specific local component which encapsulates the calls to the predefined interface in the form of objects called resource objects, while moreover one server for managing the predefined interface is provided per domain for implementing the encapsulation of the transaction validation protocol, thus allowing multiple distributed objects to execute multiple requests in the same single transaction.

Thus, contrary to all expectation, according to this characteristic of the invention, encapsulating the calls to the predetermined interface in the form of resource objects provides an efficient, rapid and convenient solution which in fact achieves the implicit integration of resource managers adapted to the predefined interface into transaction applications managed by the transaction manager, no matter what type of requests are passing through the ORB. Remarkably, the components necessary to the utilization of the invention can be easily provided, on the one hand with the specific local components integrated into the libraries linked to the application program which accesses the resource manager in order to execute the operations associated with the transaction, and on the other hand with the servers for managing the predefined interface, which implement the encapsulation of the transaction validation protocol, a different predefined interface management server being provided for each resource manager adapted to a different predefined interface. Thus, the result of the implicit integration of resource managers adapted to the predefined interface is to integrate the participation of present and future resource managers on the market into a distributed transaction managed by the transaction manager by using objects which control the transaction validation protocol of the resource manager through the predefined interface. In this way, implementing the participation of the resource managers through the predefined interface, which would seem to be difficult and not very practical, can be easily achieved according to the concept of the invention. By providing for the implicit integration of this participation, the present invention makes it possible to free the developers and programmers of applications from any difficulty, and to advantageously create distributed transaction applications that are portable and consistent.

BRIEF DESCRIPTION OF THE DRAWINGS

The following description in reference to the appended drawings, given entirely as a non limiting example, will make it clearly understood how the invention may be embodied.

DESCRIPTION OF THE PREFERRED EMBODIMENTS

A few reminders regarding the "X/OPEN" distributed transaction processing model will be useful at this point in order to better understand how the resource managers in conformity with this model can be integrated into applications based on the model of the present system according to the invention. The architecture of the present system allows an implicit integration wherein the participation of the resource managers in a distributed transaction is encapsulated into objects provided by this present system which control the transaction validation protocol through the XA interface. The "X/OPEN" distributed transaction processing model defines resource managers which, as indicated above, are components which authorize access to shared resources such as data bases, file systems or print servers. A resource is said to be recoverable when, having been allocated by a transaction, it can be modified if the transaction is validated ("commit") or remain in its original state if the transaction is cancelled ("rollback"). By controlling access to a shared recoverable resource, the resource manager makes it possible to guarantee that this resource will return to a consistent state after any potential fault or failure. X/OPEN also defines the XA interface between the transaction manager and the resource manager. This XA interface allows the involvement and the cooperation of heterogeneous resource managers in a single distributed transaction and adheres to a two-phase commit protocol managed by the transaction manager. A few instructions or routines used by this XA interface are explained below, it being understood that two types of routines are used. A first type allows a resource manager to call a transaction manager, a transaction manager in conformity with the X/OPEN model being assumed to provide the routines of this first type for allowing the resource managers to dynamically control their participation during the initiation of transactions, thus:

ax_reg makes it possible to register a resource manager through a transaction manager, ax_unreg allows the transaction manager to clear the registration of a resource manager.

The second type of routine relates to routines provided by the resource managers and called by the transaction managers in order to inform these resource managers of the initiations of transactions, thus:

xa_close makes it possible to disconnect from the resource manager, xa_commit makes it possible to request a resource manager to validate a transaction, xa_end makes it possible to dissociate an execution unit from a transaction, xa_forget allows the resource manager to forget the knowledge it has of a transaction completed heuristically, xa_open makes it possible to connect to the resource manager and initialize it for use by an application program, xa_prepare makes it possible to request the resource manager to prepare to validate a transaction, xa_recover makes it possible to obtain from the resource manager a list of transaction identifiers it has prepared or completed heuristically, xa_rollback makes it possible to request a resource manager to cancel a transaction, xa_start makes it possible to start or restart a transaction; it also associates an identifier with a future task that the execution unit requests from the resource manager, thus making it possible to indicate to the resource manager that the future tasks will be executed on behalf of a transaction.

In order to access this second type of routine, the transaction manager uses a structure called xa_switch_t, whose name is published by the resource manager. This structure contains all the entry points to the routines of the second type as well as information relative to the resource manager such as its name. However, a resource manager knows that certain required tasks are executed on behalf of a given transaction from the fact that the calls from the transaction manager and from the application program are sent to the same execution control unit, and for the utilization of certain routines of the second type, this imposes the following restraints:

at the opening and the closing of the resource managers, the calls to the routines xa_open and xa_close must be executed for each execution control unit accessing the resource manager, and the call to the routine xa_open must be executed before sending any other call to a routine of the second type. All associations of an execution control unit with transactions must be completed by the transaction manager before it dissociates the resource manager from the application by calling the routine xa_close;

when execution units are associated with transactions, the calls to the routines xa_start and xa_end must be executed from the same execution control unit that accesses the resource manager.

as for the calls to routines of the second type participating in the two-phase commit protocol, only one call to the routine xa_prepare is allowed for requesting the resource manager to prepare to validate the work executed on behalf of a transaction, the subsequent calls of this routine resulting in an error, and all associations of execution control units with the transaction, that is the processes involved in the transaction, must be completed before the system can request the resource manager to prepare the validation.

Figure 1:
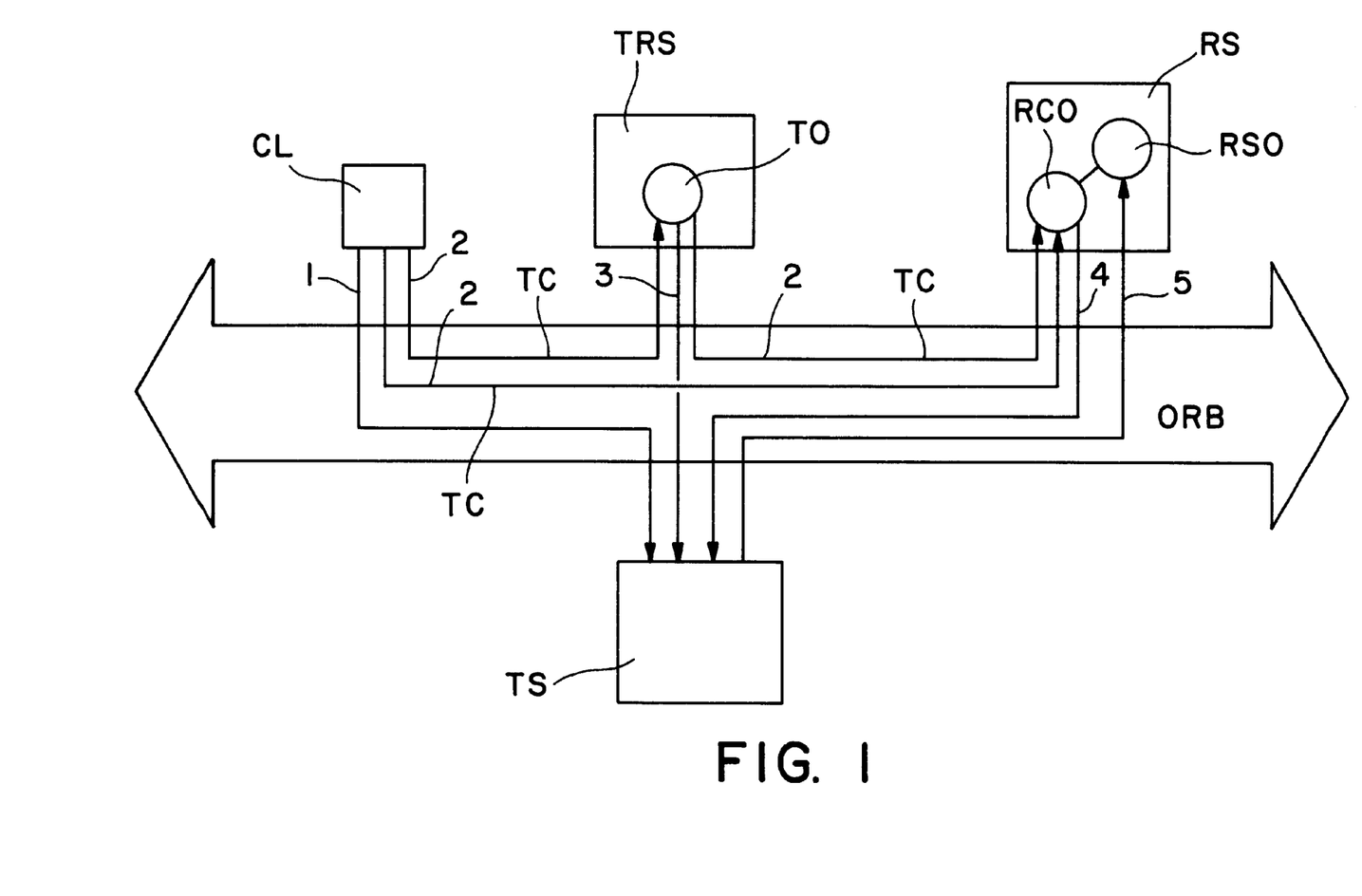
FIG. 1 represents, in highly schematic fashion, an example of an exchange of information (requests and responses to requests) between a client and a server communicating through the ORB, an example which makes it possible to indicate the interaction between the various components according to the invention.

The system for managing and processing transactions according to the invention also, of course, provides the general functionalities such as initiating or completing the transactions, controlling the propagation and the span of the transactions, allowing multiple objects to be involved in a single transaction, allowing objects to associate changes in their internal state with a transaction, or coordinating the completion of transactions by means of a two-phase (preparation and validation) commit and the ability to back out. This system for managing and controlling transactions thus defines interfaces which allow multiple distributed objects to execute multiple requests in the same transaction. The following definitions, with the aid of FIG. 1, will provide a better understanding the contents of the invention. Thus, within the context of distributed transaction applications, where a distributed transaction can involve multiple distributed objects executing multiple requests, a transaction client is a client CL that invokes various operations within the same transaction, while a client that initiates the transaction is called the requestor or initiator of the transaction. The span of a transaction is defined by a transaction context TC which is shared by all of the participating objects, the transaction context being propagated with each transaction request, the transaction objects TO of a transaction server TRS participating in the propagation of the transaction. At the level of a recoverable server RS, the recoverable objects RCO are transaction objects wherein the data are assigned by the validation ("commitment") or the cancellation ("rolling back") of the transaction, a recoverable object causes a so-called resource object RSO to be registered by the transaction service TS in order to associate the changes performed on this data with this transaction. The transaction service controls the two-phase commit protocol by sending requests to the registered resources. The interaction between these various components is indicated below with the aid of FIG. 1. The path ending in an arrow labelled 1 indicates that a transaction client CL initiates and completes the transaction. The path ending in an arrow labelled 2 indicates that a transaction context TC is created when a transaction is initiated and is transmitted to the transaction objects TO and to the recoverable objects RCO with each transaction request. The path marked with an arrow labelled 3 indicates that a transaction object TO propagates the transaction without being involved in the completion of this transaction, however it can force the cancellation ("rollback") of this transaction. In the path marked with an arrow labelled 4, a recoverable object RCO causes a resource object RSO to be registered by the transaction service TS in order to allow the completion of the transaction; it can also force the cancellation ("rollback") of this transaction. Finally, the path marked with an arrow labelled 5 indicates that a resource object RSO participates in the completion of the transaction according to the two-phase commit protocol controlled by the transaction service TS. In this way, complete interoperability is obtained between this functional model according to the invention and the X/OPEN distributed transaction processing model. Because of this total compatibility between these two models, the recoverable objects can be implemented using resource managers adapted to the XA interface, while the system for processing and managing transactions according to the invention implements the encapsulation of this XA interface, the implicit registration of the resource objects as well as the coordination of the recovery and the completion of the transactions. The system according to the invention associates a certain number of objects with each transaction, which objects are used to form the transaction context TC and are preferably the following:

the coordination object, whose interface allows the recoverable objects to register resources for the completion of a transaction, the completion object, whose interface supports the operations for validating or cancelling the transaction, or the control object, which allows the clients to retrieve both the coordination and completion objects.

In order to manage a transaction, the client applications CL can use two types of context management: direct context management, with which the client application manipulates the objects of the transaction service TS by directly invoking the objects which represent the transaction, and indirect context management, with which the client application does not see the objects of the transaction service TS, which are manipulated internally by the system according to the invention. Moreover, a transaction object can require that information related to transactions be propagated either implicitly or explicitly. In the implicit propagation mode, the transaction context is propagated with the request in a transparent way through the ORB, which mode involves cooperation between the ORB and the transaction service TS, whereas in the explicit propagation mode, the information related to transactions appears in the form of explicit parameters given by the client. During transactions, the clients can use one or both forms of context management and can communicate with objects which may require either transaction propagation mode, the interfaces of the system allowing this switching between these two modes. However, in the majority of applications two combinations predominate. The first corresponds to the use of direct context management and an explicit transaction propagation mode, in which case the coordination, completion and control objects are manipulated directly at the level of the programming of the application and at least some of them are propagated explicitly as arguments; this combination makes it possible to develop transaction applications with implementations similar to a traditional CORBA ("Common Object Request Broker Architecture," a specification of the OMG and X/OPEN) application. The second corresponds to the use of indirect context management and an implicit transaction propagation mode, in which case the client application uses the current local object to create and control the transaction and to associate the transaction context with execution units. When the client sends a request to transaction objects, the transaction context associated with the current execution unit is implicitly propagated with the request.

The system according to the invention also makes it possible to check the integrity of a transaction, since with the implicit transaction propagation mode it monitors the "behavior" of a transaction by ensuring that:

no request is pending at the moment the client initiating the transaction wishes to validate it. This can occur when deferred synchronous requests are sent during the transaction and the commit instruction is called, whether direct or indirect context management is used, before all the requests have been sent.

no request is pending at the moment of the return of a process. This can occur when deferred synchronous requests are emitted during the processing of a request and the end of this processing occurs before all the responses to these requests have been received.

a single, unique execution unit is running when a commit is requested by the initiating client.

Characteristically, a resource object represents the involvement or participation of a recoverable object in a transaction. Normally, the resource objects and the recoverable objects are independent objects, which allows a recoverable object to participate in several transactions simultaneously and to register a different resource object for each transaction. On the other hand, in this case the fact that it registers itself as the resource object means that the recoverable object participates in only one transaction at a time. The registration of resource objects is carried out by calling the resource registration instruction in the coordination object. For this purpose, depending on the context management mode used, a recoverable object must first of all retrieve the object label of the coordination object using the appropriate operations. Because a recoverable object can receive several requests for the same transaction, it must, at a first time, verify whether the resource object has already been registered for the same transaction. The resource registration operation returns the object label of the recoverable coordination object, which must be registered in a permanent storage device so that it can be used during the recovery phase in case of failure.

In this example, the protocol used is a two-phase commit protocol with back out capability; with this model, the coordination object that initiates this protocol does not need to store any information by recording it in a stable way before deciding to validate the transaction, and the resource objects do not need to record anything before initiating a preparation operation. However, the recording allows the system to complete and carry out transactions in case of failure or any malfunction.

Remarkably, in the process implemented by the system according to the invention, in the case of the normal completion of a transaction wherein at least one resource has requested a commit and the other resources involved have either requested a commit or a simple reading, the recording of various information is carried out in order to allow an automatic restart of the transaction after a failure has occurred: the recording of the information required by the resource object to determine the result of the transaction during a recovery after a failure after which its changes were prepared, that is basically, the object label of the recoverable coordination object that has been returned by the resource registration instruction, the recording of the information required by a coordination object to complete the transaction after a recovery following a failure, that is, the object label of the control object and the object labels of the registered resources that have requested a commit, the recording of any decision made heuristically so that the resource object can again determine the same result for the transaction in the case where the validation operation is executed more than once; if a decision has been made heuristically, it is added to the recording of the information required by the coordination object to complete the transaction, which decision made heuristically until this coordination object has initiated the operation makes it possible to forget this decision for all the resources that have made decisions heuristically.

Remarkably, when only one resource object has been registered, then only one validation operation is executed in the resource object, and no recording of information is necessary.

It must be noted that for the initiating client, the validation of the transaction does not necessarily mean that the transaction will be validated; in some cases, the transaction will be cancelled, for example, when at least one of the participants in the transaction does not want to validate the latter or when the instruction timeout associated with this transaction and set at the time of creation has expired.

In the case where a malfunction has occurred and a recoverable server has been restarted, the server reads the record in order to retrieve the object labels of the recoverable coordination objects. Each resource object calls the operation which makes it possible to rerun the end of the transaction in the corresponding recoverable coordination object. The restart and recovery of the recoverable objects are thus controlled by the transaction manager.

The resource managers adapted to the XA interface can be used to store data liked to the transactions, the association of the resource manager with the transaction being achieved by means of operations through the XA interface. The system according to the invention implements the encapsulation of the calls of the XA interface, which consequently appear completely transparent to the programmer of a transaction application. In order to effectively solve the problems posed by these various constraints, according to the invention, as presented in FIG. 2, a recoverable server architecture is proposed, which architecture advantageously makes it possible to integrate a resource manager adapted to the predefined interface, for example the XA interface.

Figure 2:
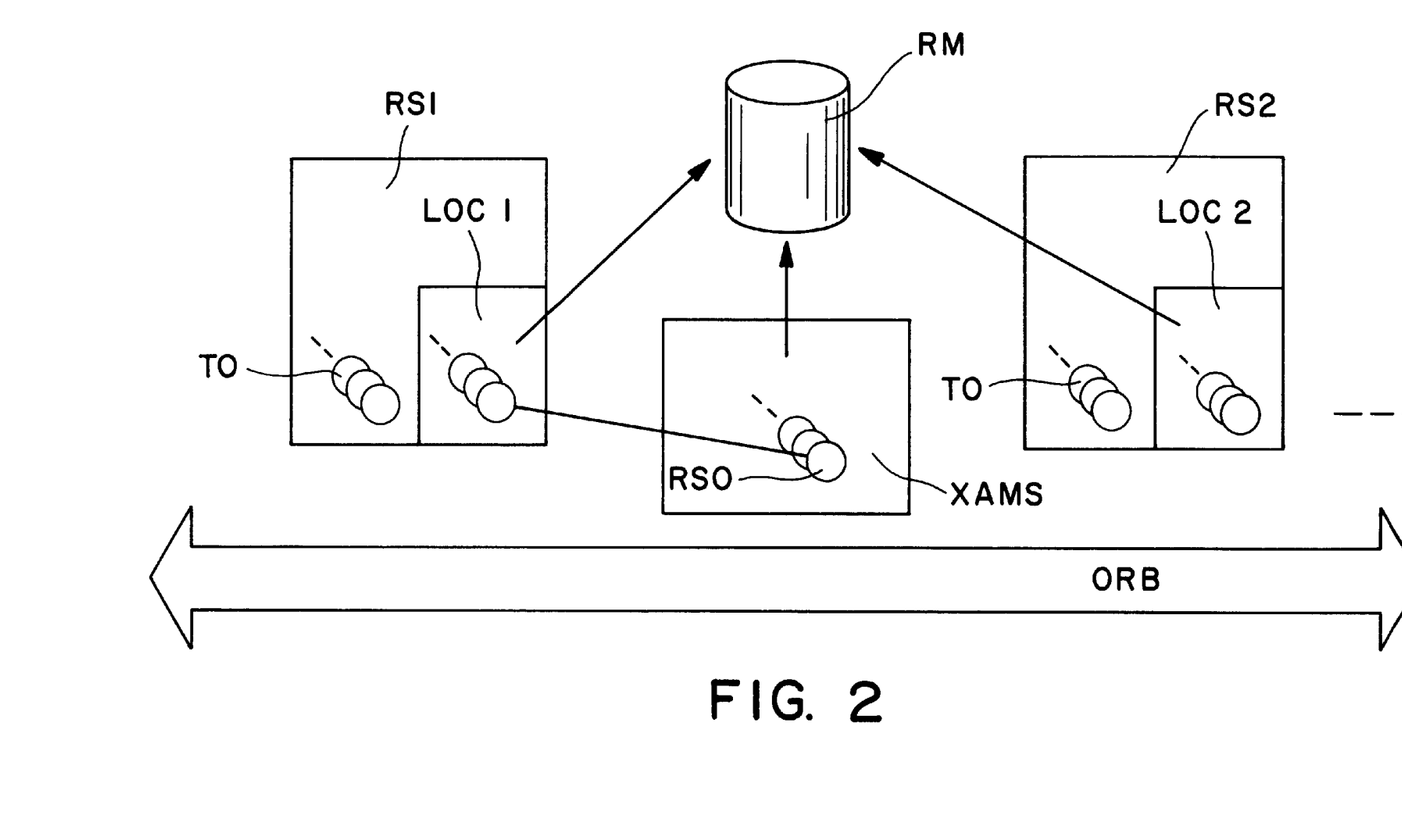
FIG. 2 offers an example of a recoverable server architecture which allows the integration of a resource manager adapted to the predefined interface.

The implicit integration of resource managers adapted to the XA interface into transaction applications managed by the system according to the invention is obtained by encapsulating the calls to the XA interface in the form of implementations of objects provided as components of the present system.

For this purpose, two types of components make it possible to encapsulate the integration of these resource managers. The first type corresponds to a local component LOC1, LOC2, etc., installed in each recoverable server RS1, RS2, etc., the library of the transaction service being linked to each recoverable server accessing a resource manager RM. This library uses local components of the system according to the invention which make it possible to achieve the implicit association of the execution units relative to the transactions, and it is also this library which makes it possible to achieve indirect context management, and implicit support of propagation and control. The second type of component corresponds to a server XAMS for managing the predefined interface, in the present example the XA interface, which server XAMS manages resource objects capable of participating in the two-phase validation or commit protocol by encapsulating the calls to the predefined interface and registering the resource objects, one per transaction, through the coordination objects of the transactions. There is one server XAMS per data base domain which manages all the resource objects for the transactions associated with the recoverable servers for this given domain, a data base in this relational context being defined as the set of tables that a given user can access.

For effective integration and utilization of the resource managers adapted to the XA interface, as indicated above, this architecture advantageously makes it possible to take into account, among other things, it being understood that no additional interface will need to be defined in order to support these resource managers, the various restrictions and conditions below:

at the opening of the resource managers, certain data bases allow only one of their domains to be accessed per process, hence only one call xa_open per process for a determined data base, and the resource managers are only initialized (xa_open) during the operations for creating the local components of the system.

the association (xa_start) and dissociation (xa_end) of execution units with transactions must be carried out for each transaction request, when the transaction is completed, all the associations with the transaction, that is all the processes involved in the transaction, must be closed with a completion operation (xa_end) before the system can request the resource manager to call the operation (xa_prepare) of the preparation phase in conformity with the two-phase validation or commit protocol, only one process is authorized to call the operation (xa_prepare) of the preparation phase in conformity with the two-phase commit protocol, only one process is authorized to call the operation (xa_commit) of the validation phase of the two-phase commit protocol, the operations (xa_prepare, xa_commit) in conformity with the two-phase commit protocol are encapsulated by the resource interface, the closing of the resource managers (xa_close) is carried out by releasing (this operation is called a "release" by one skilled in the art) the local components when the server is disconnected.

the recovery (xa_recover) is executed internally during the startup of the server for managing the XA interface in order to execute an automatic restart procedure, a call xa_recover being executed by the server for managing the interface XA to the resource manager in order to retrieve the identifiers of the transactions that have been prepared or completed heuristically. Only the identifiers created by the system according to the invention are taken into consideration, these identifiers containing a specific value of this system.

When any failures are discovered, automatic restart procedures are implemented. In the case of a failure involving the restart of the transaction management server, the restart procedure makes it possible to complete an interrupted transaction as long as the failure occurred after the recording of a validation decision. In this case, the transaction manger is capable of executing the second phase of the commit protocol, all other cases resulting in the cancellation of the transaction. In the case of a failure involving the restart of the server for managing the predefined interface, the restart procedure is comprised of contacting the resource manager, for example the data base, and of recovering the identifiers of the transactions that are in the prepared state (operation xa_recover), then of recreating the corresponding resource objects so that the latter contact the transaction manager to indicate to it that they are ready to participate in the second phase of the commit protocol for the interrupted transaction.

Using the requests from the ORB, which are transparent relative to the application program, provides interoperability between the local components and the objects of the server for managing the XA interface.

The implicit integration of the resource managers adapted to the XA interface can only be achieved with an operation in the implicit propagation mode. The association of execution control units with the transaction is carried out by calling the operation xa_start upon reception of a request, which makes it possible to ensure that the association is achieved before any required work is executed. The dissociation of the execution units from the transaction is itself obtained by calling the operation xa_end at the sending of a response to a request, which makes it possible to ensure that the dissociation is only carried out when all the required operations have been executed, the system according to the invention involving a control which prevents any return of a response when any pending request exists. Thus, due to the fact that the reception of a request and the sending of a response to this request are always executed for the same execution unit specific to this request, this mode makes it possible to guarantee that the operations xa_start and xa_end are called from the same execution control unit accessing the resource manager.

Remarkably, upon reception of a preparation request according to the two-phase commit protocol, the resource object requests the local component of each recoverable server to terminate the association of the execution unit with the transaction by calling the appropriate dissociation operation (xa_end). When all the associations have been terminated, the resource object transfers a preparation operation to the resource manager and returns the appropriate decision.

In summary, a developer supplying transaction objects who wants the permanent, and therefore durable, data of his objects to be managed by a resource manager, for example a data base, must:

provide for the implementation of the specific object by executing accesses to the resource manager so as to update the permanent data, the objects RCO in FIG. 1, associate these objects other objects, that is, resource objects capable of participating in the transaction validation protocol initiated by the transaction manager. It must be noted that the implementation of these objects is complex, since they must be able to dialogue simultaneously with the transaction manager (registration of the resources, participation in the validation protocol) and with the resource manager (association of the execution units, synchronization of the various participating servers, implementation of the validation protocol, implementation of restart procedures in case of failure).

One of the advantages of the invention resides in the fact that the provider of transaction objects is completely freed from having to manage these resource objects. He can therefore concentrate on implementing the specific object he provides, the rest being managed in a completely transparent way. Another powerful advantage results from the fact that in order to manage the relations between these resource objects and the resource manager, the predefined XA interface, which is standardized, is used, thus ensuring portability and making it possible to use all existing and future resource managers on the market provided they are compatible with the interface used.

For this reason, the system according to the invention is mainly comprised of servers implementing the various objects used and of libraries which must be linked to the components of the client and/or server applications. Two categories of servers implement the various objects used. The first category corresponds to the transaction management server, which implements objects providing the functionalities of the system for creating transactions, coordinating the transaction validation protocol, for example a two-phase commit, completing and terminating transactions and coordinating recovery. The second category corresponds to the servers for managing the predefined interface, for example the XA interface, which manage resource objects capable of participating in the validation protocol by encapsulating calls to the predefined interface, objects which achieve the implicit integration of the resource managers adapted to the XA interface, the latter being used only by applications using resource managers adapted to the XA interface to store permanent data related to transaction objects. As for the libraries, they implement the local components capable of providing indirect context management, and the control and management of local information related to the transaction context. Two types of libraries are provided, depending on whether or not the application uses resource managers adapted to the XA interface, these two types being implemented from shared libraries and being used in the direct context management and implicit transaction propagation modes. The first type of library contains the "stubs" (as they are known to one skilled in the art) generated by the interface definition language (IDL) compiler for accessing the objects of the transaction manager. The second type of library contains the stubs generated by the interface definition language compiler for accessing the objects of the server for managing the interface XA, this latter type being used only by applications using resource managers adapted to the interface XA to store data related to permanent objects.

The system according to the invention, due to its design, allows easy interconnection with any resource manager adapted to the XA interface for a large number of applications which use and access relational data base management systems such as, for example, Oracle (trademark of Oracle Corporation and Bull S.A.), Sybase (trademark of Sybase, Inc.), Informix (trademark of Informix Software, Inc.) etc.

In conclusion, as a result of the concept of the invention, encapsulating the calls to the predetermined interface in the form of resource objects provides an efficient, fast and convenient solution which in fact achieves the implicit integration of resource managers adapted to the predefined interface into transaction applications managed by the transaction manager, no matter what type of requests are passing through the ORB. The necessary components can be easily provided, on the one hand with the libraries linked to the application program accessing the resource manager in order to execute the operations associated with the transaction, and on the other hand, with the servers for managing the predefined interface, which implement the encapsulation of the validation protocol of the transaction, a different predefined interface management server being provided for each different resource manager adapted to the predefined interface. The result of the implicit integration of resource managers adapted to the predefined interface is to integrate the participation of present and future resource managers on the market into a distributed transaction managed by the transaction manager using objects which control the validation protocol of the transaction from the resource manager through the predefined interface. Thus, implementing the participation of the resource managers through the predefined interface, which would seem to be difficult and not very practical, can be easily achieved according to the concept of the invention. By providing for the implicit integration of this participation, the present invention makes it possible to free the developers and programmers of applications from any difficulty, and to advantageously create distributed transaction applications that are portable and consistent. This technological choice makes it possible to significantly reduce costs, since any development for upgrading or enhancing the initial system is avoided, while portability to various systems is rendered easy with implementations like those of CORBA.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A system for managing and processing object transactions in a network of distributed resources operating in the client-server mode, wherein the client sends a request to at least one transaction object contained in at least one of multiple servers distributed across the network, while a transaction manager dialogues with a resource manager through a predefined interface by means of a transaction validation protocol, comprising:

said system being arranged and configured to achieve implicit integration of resource managers adapted to the predefined interface so as to integrate participation of resource managers into a distributed transaction managed by the transaction manager, by providing objects capable of participating in the transaction validation protocol implemented by the transaction manager, which objects address the resource managers through the predefined interface;

each said server comprising a specific local component which encapsulates calls to the predefined interface in the form of resource objects, and one of said servers being designated for managing the predefined interface is provided per domain for implementing encapsulation of the transaction validation protocol, thereby allowing multiple distributed objects to execute multiple requests in the same single transaction.

2. The system for managing and processing object transactions according to claim 1, characterized in that the specific local component encapsulating the calls to the predefined interface is integrated into a library linked to an application program accessing the resource manager in order to execute operations associated with said transaction.

3. The system for managing and processing object transactions according to claim 1, characterized in that when a client initiates a transaction, a transaction context is created and is transmitted to the transaction objects and to the recoverable objects with each transaction request, which transaction context is formed by a certain number of coordination, completion and control objects associated with each transaction, the coordination object allowing the recoverable objects to register resources for completing a transaction, the completion object supporting the operations for validating or canceling the transaction, and the control object allowing the client to retrieve both the coordination and completion objects.

4. The system for managing and processing object transactions according to claim 1, characterized in that when a client initiates a transaction, a transaction context is created and is transmitted to the transaction objects and to the recoverable objects with each transaction request, which transaction context is formed by a certain number of coordination, completion and control objects associated with each transaction, the coordination object allowing the recoverable objects to register resources for completing a transaction, the completion object supporting the operations for validating or canceling the transaction, and the control object allowing the client to retrieve both the coordination and completion objects.

5. The system for managing and processing object transactions according to claim 2, characterized in that when a client initiates a transaction, a transaction context is created and is transmitted to the transaction objects and to the recoverable objects with each transaction request, which transaction context is formed by a certain number of coordination, completion and control objects associated with each transaction, the coordination object allowing the recoverable objects to register resources for completing a transaction, the completion object supporting the operations for validating or canceling the transaction, and the control object allowing the client to retrieve both the coordination and completion objects.

6. The system for managing and processing object transactions according to claim 3, in the case of the normal completion of a transaction wherein at least one resource has requested a commit and the other resources involved have either requested a commit or a simple reading, characterized in that: the recording of various information is carried out in order to allow an automatic restart of the transaction after a failure has occurred, the recording of the information required by the resource object to determine the result of the transaction during a recovery after a failure after which its changes were prepared, the recording of the information required by a coordination object to complete the transaction after a recovery following a failure and the recording of any decision made heuristically so that the resource object can again determine the same result for a transaction in the case where the validation operation is executed more than once; adding the decision to the contents of the recording of the information required by a coordination object to complete the transaction if the decision is made heuristically, which decision made heuristically until the coordination object has initiated the operation makes it possible to forget said decision for all the resources that have made decisions heuristically.

7. The system for managing and processing object transactions according to claim 4, in the case of the normal completion of a transaction wherein at least one resource has requested a commit and the other resources involved have either requested a commit or a simple reading, characterized in that: the recording of various information is carried out in order to allow an automatic restart of the transaction after a failure has occurred, the recording of the information required by the resource object to determine the result of the transaction during a recovery after a failure after which its changes were prepared, the recording of the information required by a coordination object to complete the transaction after a recovery following a failure and the recording of any decision made heuristically so that the resource object can again determine the same result for a transaction in the case where the validation operation is executed more than once; adding the decision to the contents of the recording of the information required by a coordination object to complete the transaction if the decision is made heuristically, which decision made heuristically until the coordination object has initiated the operation makes it possible to forget said decision for all the resources that have made decisions heuristically.

8. The system for managing and processing object transactions according to claim 5, in the case of the normal completion of a transaction wherein at least one resource has requested a commit and the other resources involved have either requested a commit or a simple reading, characterized in that: the recording of various information is carried out in order to allow an automatic restart of the transaction after a failure has occurred, the recording of the information required by the resource object to determine the result of the transaction during a recovery after a failure after which its changes were prepared, the recording of the information required by a coordination object to complete the transaction after a recovery following a failure and the recording of any decision made heuristically so that the resource object can again determine the same result for a transaction in the case where the validation operation is executed more than once; adding the decision to the contents of the recording of the information required by a coordination object to complete the transaction if the decision is made heuristically, which decision made heuristically until the coordination object has initiated the operation makes it possible to forget said decision for all the resources that have made decisions heuristically.

9. The system for managing and processing object transactions according to claim 3, characterized in that when only one resource object has been registered, only one validation operation is executed in the resource object without any recording of information.

10. The system for managing and processing object transactions according to claim 4, characterized in that when only one resource object has been registered, only one validation operation is executed in the resource object without any recording of information.

11. The system for managing and processing object transactions according to claim 5, characterized in that when only one resource object has been registered, only one validation operation is executed in the resource object without any recording of information.

12. The system for managing and processing object transactions according to claim 3, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

13. The system for managing and processing object transactions according to claim 4, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

14. The system for managing and processing object transactions according to claim 5, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

15. The system for managing and processing object transactions according to claim 6, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

16. The system for managing and processing object transactions according to claim 7, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

17. The system for managing and processing object transactions according to claim 8, characterized in that in the case where a malfunction has occurred and a recoverable server has been restarted, the server reads the record in order to retrieve the object labels of the recoverable coordination objects, each resource object calling the operation that makes it possible to rerun the end of the transaction in the corresponding recoverable coordination object, the restart and the recovery of the recoverable objects thus being controlled by the transaction manager.

18. The system for managing and processing object transactions according to claim 3, characterized in that upon reception of a preparation request according to the two-phase commit protocol, the resource object requests the local component of each recoverable server to terminate the association of the execution unit with the transaction by calling the appropriate dissociation operation, whereas when all the associations have been terminated, the resource object transfers a preparation operation to the resource manager and returns the appropriate decision.

19. The system for managing and processing object transactions according to claim 6, characterized in that upon reception of a preparation request according to the two-phase commit protocol, the resource object requests the local component of each recoverable server to terminate the association of the execution unit with the transaction by calling the appropriate dissociation operation, whereas when all the associations have been terminated, the resource object transfers a preparation operation to the resource manager and returns the appropriate decision.

20. The system for managing and processing object transactions according to claim 12, characterized in that upon reception of a preparation request according to the two-phase commit protocol, the resource object requests the local component of each recoverable server to terminate the association of the execution unit with the transaction by calling the appropriate dissociation operation, whereas when all the associations have been terminated, the resource object transfers a preparation operation to the resource manager and returns the appropriate decision.

* * * * *